No. 789,088. PATENTED MAY 2, 1905.
B. R. FALES.
EXPANSION JOINT.
APPLICATION FILED MAY 31, 1904.
·FIG·1·
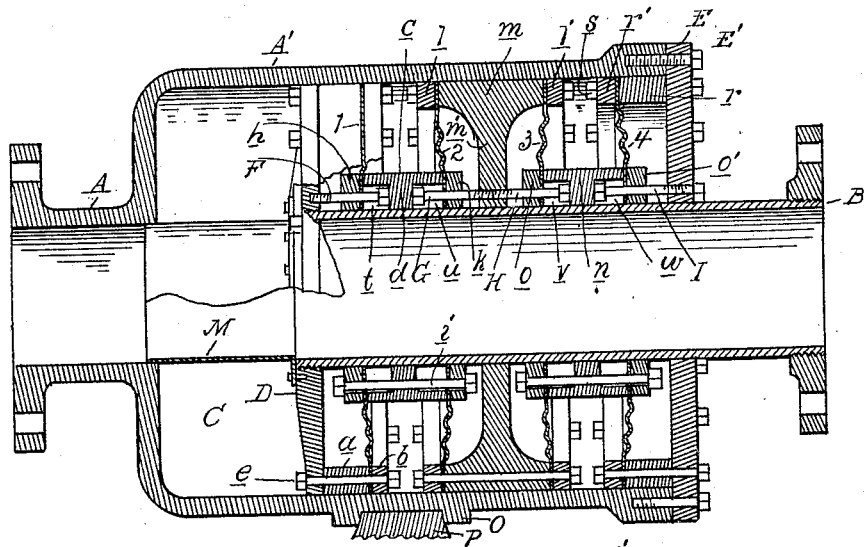
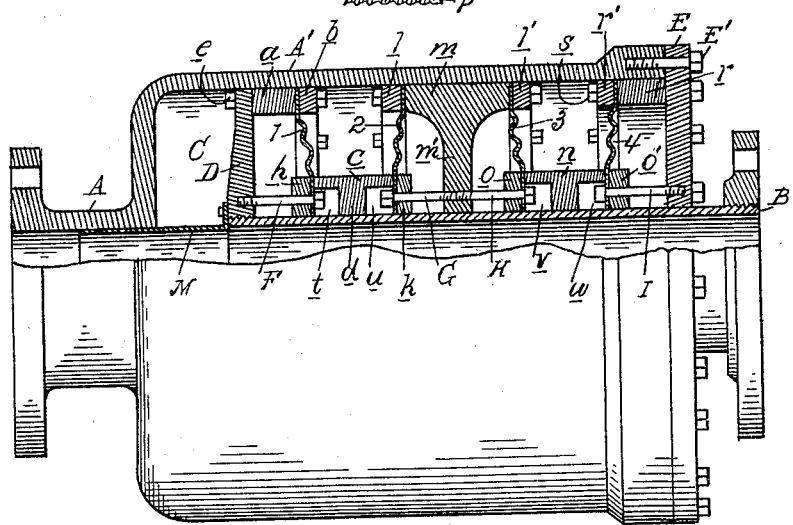
·FIG·2·  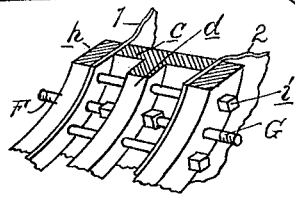  ·FIG·3·
WITNESSES
Geo. H. Grove
Jas. P. Barry
INVENTOR
Bingley R. Fales
BY James Whittemore
ATT'Y.

No. 789,088. Patented May 2, 1905.

UNITED STATES PATENT OFFICE.

BINGLEY R. FALES, OF DETROIT, MICHIGAN.

EXPANSION-JOINT.

SPECIFICATION forming part of Letters Patent No. 789,088, dated May 2, 1905.

Application filed May 31, 1904. Serial No. 210,457.

*To all whom it may concern:*

Be it known that I, BINGLEY R. FALES, a citizen of the United States, residing at Detroit, in the county of Wayne and State of Michigan, have invented certain new and useful Improvements in Expansion-Joints, of which the following is a specification, reference being had therein to the accompanying drawings.

The invention relates to new and useful improvements in expansion-joints for pipes; and it consists in the construction of a multiple of diaphragms so combined and arranged that the various diaphragms each take up a portion of the expansion within the limit of expansion of the joint. After one diaphragm has taken up its proportion of the expansion another diaphragm acts until the expansion ceases. By this means I am able to employ diaphragms of small diameter, and no one of them will be strained; also, nearly any desired number of diaphragms may be coupled together, so that a large amount of expansion is taken care of in a single joint. Hence in mains for city heating plants fewer expansion-joints are required.

The invention further consists in the construction, arrangement, and combination of parts more specifically pointed out in the claims.

In the drawings, Figure 1 is a vertical central longitudinal section through an expansion-joint embodying my invention, the parts being in the contracted position of the parts. Fig. 2 is a similar view, partly in elevation, showing the parts fully extended by expansion. Fig. 3 is an inner perspective view of one of the diaphragm-clamping wings to illustrate the arrangement of the bolts.

A represents one member, and B the other member, of the joint. These members may be provided with flanges for coupling to the ordinary flanges of the pipes of the conduit in which the joint is to be used. In the specific form of my device here shown I have shown the member A provided with an enlarged cylindrical end parallel with and large enough to have the member B enter therein and leave the diaphragm-chamber C between. In this form I have shown four diaphragms 1, 2, 3, and 4 alike and each made of corrugated sheet metal ring-shaped.

On the inner end of the member B is a ring-shaped head D. I have shown it screwed on. At its outer end are the clamping-rings $a$ and $b$, between which is clamped the outer edge of the diaphragm, as by bolts $e$. Surrounding the member B is the ring $c$, having a central guide-flange $d$.

$h$ is a clamping-ring for clamping the inner edge of the diaphragm 1 to the ring $c$, the clamping-bolt $i$ therefor passing through this ring, the flange $d$, and the clamping-ring $k$, which clamps the inner edge of the diaphragm 2 to the ring $c$. This ring slides freely on the member B. The outer edge of the diaphragms 2 and 3 are clamped by the rings $l$ and $l'$ to the ring $m$, which has an inwardly-extending flange $m'$, resting on the member B. The inner edges of the diaphragms 3 and 4 are clamped to a ring $n$ (similar to the ring $c$) by the clamping-rings $o$ and $o'$, the bolts therefor passing through both rings, as described for ring $c$. The outer edge of the diaphragm 4 is clamped to a ring $r$ by a ring $r'$ and bolts $s$. E is a ring-shaped head on the shell A', held by bolts E' and fitting quite closely about the member B.

F, G, H, and I are bolts secured, respectively, as shown, to the head D, flange $m'$ of the ring $m$, and the head E and act as stops to limit the amount of movement of the various diaphragms and to cause the various diaphragms to take their proportion of the expansion. The bolts F and G project through the rings $h$ and $k$ on the ring $c$, and their heads are in the spaces $t$ and $u$ between these rings and the flange $d$. The bolts H and I project through the rings $o$ and $o'$, and their heads are in the spaces $v$ and $w$ between these rings and the flange of the ring $n$.

The parts being thus constructed and the two members A and B being connected to pipe-mains and being in the position shown in Fig. 1, their operation is as follows, assuming that the member A A' is anchored against longitudinal movement, while the member B is free to expand into the member A: As the pipe connected to the member B expands it will project the member B inward and, the head D being connected to the outer end of the diaphragm 1, it will draw the other edge of the diaphragm with it. This will continue until the head of the bolt F strikes the ring $h$, when the expansion movement of that diaphragm will cease and it will be pushed bodily thereafter. As soon as the head of the bolt strikes the ring $h$ the ring $c$ will be drawn forward, moving with it the lower edge of the diaphragm 2 until the head of the bolt G strikes the ring $k$, and as this bolt G is connected to the flange $m'$ on the ring $m$ further expansion of the member B will move the ring $m$ thereof and carry the outer end of the diaphragm 3 with it until the head of the bolt H strikes the ring $o$, which will then move the ring $n$ with it and move the diaphragm 4 to the position shown in Fig. 3 until the head of the bolt I strikes the ring $o'$. This is the limit of this particular expansion-joint; but it is obvious that if further expansion is required more diaphragms connected up in the same manner may be added to any desired number.

While I have described the diaphragms as acting successively and also have described the action as if the member B were the only one that expanded, the member A being anchored, it is possible that the friction of the parts might cause some of the diaphragms to act simultaneously; but under ordinary circumstances they will probably act successively, as described. If the members A and B are neither anchored, then of course the diaphragm 4 and the diaphragm 1 will each commence to take up the expansion of the parts, telescoping in relation to each other. It is ordinarily the practice to anchor one member and have the expansion taken at only one end of the pipe-line.

While I have shown four diaphragms, it is quite obvious that two might be employed, if desired, or more than four, and I do not desire to be limited to the construction in which four or more are employed.

By having a series of diaphragms each successively take up a portion of the expansion, with stops to limit the expansion of any one of the diaphragms, so that they cannot be strained beyond a reasonable amount, I am enabled to make an expansion-joint of very small diameter, so that the end thrust on the pipe, due to the steam-pressure on the edge of the expansion-joint of the diaphragm members, will be very greatly reduced. The expense of construction is also greatly reduced, and the expense of building the wells in which the expansion-joints are located is also cut down a very large amount. The danger of leaking or straining the diaphragms is also cut down to a minimum, and acutal trial of expansion-joints of this kind demonstrates that it may be used to take up expansion a great number of times without leakage, even a thousand or more. In the use of such joints for municipal heating plants it is obvious that the expansion and contraction practically takes place but several times each year—that is, when the steam or hot water is turned on and off—so that with this construction I am enabled to get a very long life for the joint.

I have shown a sleeve or nipple M secured to the end of the member B and extending into the member A. This is simply to prevent eddying of the steam or water in the conduit, which might take place if the space between the head D and the end of the section $A'$ of the member A were left open.

When the member A is to be anchored, it can be done in any suitable manner, many devices being now in use for that purpose. For instance, I have shown the member A provided with the flanges O, between which may rest a foot P, which may be anchored, as is usually the case, by embedding it in cement or tiling it into a foundation. This being a construction so well understood in the art, I do not deem it necessary to illustrate it further.

What I claim as my invention is—

1. An expansion-joint to be interposed between two pipes, comprising a multiple of connected diaphragms connected to the pipes, and means to compel the diaphragms to move successively each to take up its portion of the expansion, and means independent of the diaphragm for compelling the same to move bodily thereafter.

2. In an expansion-joint for pipes, the combination of a multiple of diaphragms, and means independent of the diaphragms for compelling each diaphragm to take up a portion only of the expansion.

3. In an expansion-joint for pipes, a flexible ring-shaped diaphragm connected at one edge to one pipe member, and at its other edge to a movable member and means independent of said diaphragm for limiting its amount of flexing.

4. The combination with relatively movable conduit-sections of a seal formed of a plurality of flexible diaphragms, independently movable within limits, and means for compelling the joint movement of said diaphragms for any movement in excess of said limits.

5. The combination with relatively movable conduit-sections of a seal comprising a plurality of flexible diaphragms inflexibly connected to each other at one edge, but independently movable within limits at their opposite edges, and means for compelling the movement of said inflexibly-connected edges upon the movement of either opposite edge beyond its limit.

6. The combination with relatively movable conduit-sections of a connection between the two sections formed of a plurality of flexible diaphragms, each movable within fixed limits, and means for compelling the movement of each diaphragm bodily without flexing, after the limit of its flexing movement is reached, and for thereafter taking the expansion upon another diaphragm.

7. The combination of an anchored tubular member, of an expansible tubular member secured thereto by a multiple of connected diaphragms, and means independent of said diaphragms for taking the expansion of said expansible member successively upon the diaphragms.

In testimony whereof I affix my signature in presence of two witnesses.

BINGLEY R. FALES.

Witnesses:
H. C. SMITH,
JAS. P. BARRY.